(12) United States Patent
Dhanabalan et al.

(10) Patent No.: US 9,641,893 B2
(45) Date of Patent: May 2, 2017

(54) CONFLICT NOTIFICATION WITH ALTERNATE PROGRAM LIST

(71) Applicant: Verizon Patent and Licensing Inc., Basking Ridge, NJ (US)

(72) Inventors: Sankar Ram Dhanabalan, Irving, TX (US); Prabhakar Mani, Coppell, TX (US); Anil Kumar Padi, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 306 days.

(21) Appl. No.: 14/269,418

(22) Filed: May 5, 2014

(65) Prior Publication Data

US 2015/0319494 A1    Nov. 5, 2015

(51) Int. Cl.
| | | |
|---|---|---|
| H04N 5/77 | (2006.01) | |
| H04N 21/458 | (2011.01) | |
| H04N 21/472 | (2011.01) | |
| H04N 21/488 | (2011.01) | |
| H04N 21/475 | (2011.01) | |
| H04N 21/482 | (2011.01) | |

(52) U.S. Cl.
CPC ....... *H04N 21/4583* (2013.01); *H04N 21/472* (2013.01); *H04N 21/4755* (2013.01); *H04N 21/47214* (2013.01); *H04N 21/4826* (2013.01); *H04N 21/4882* (2013.01)

(58) Field of Classification Search
CPC .... G11B 31/006; G11B 33/10; H04N 5/2251; H04N 5/772; H04N 5/765

USPC .......................................................... 386/293
See application file for complete search history.

(56) References Cited

U.S. PATENT DOCUMENTS

| | | | | |
|---|---|---|---|---|
| 7,917,008 B1* | 3/2011 | Lee | ........................... | H04N 5/76 386/291 |
| 8,615,164 B1* | 12/2013 | Kotab | .................... | H04N 5/765 386/292 |
| 2004/0103434 A1* | 5/2004 | Ellis | .................... | H04N 5/44543 725/58 |
| 2011/0119715 A1* | 5/2011 | Chang | .................... | G08C 17/02 725/53 |
| 2013/0136419 A1* | 5/2013 | Herby | .................... | H04N 5/782 386/243 |
| 2015/0089555 A1* | 3/2015 | Abkairov | ................ | H04L 65/60 725/93 |

* cited by examiner

*Primary Examiner* — William C Vaughn, Jr.
*Assistant Examiner* — Daniel Tekle

(57) ABSTRACT

A device receives a recording schedule for programs to record at a future time and causes, based on the recording schedule, at least some of the programs to be recorded in the device memory to create recorded content. The device detects use of the device, by a user, to initiate obtaining content that creates a conflict with the recording schedule. The device identifies alternate content, from the recorded content, that is related to the content that creates the conflict with the recording schedule. The device presents, to the user, a notification of the conflict. The notification includes a list of at least some of the alternate content from the recorded content such that the user can select alternate recorded content from the notification menu without disrupting the recording schedule.

20 Claims, 13 Drawing Sheets

CONFLICT NOTIFICATION WITH ALTERNATE PROGRAM LIST

BACKGROUND

Set-Top Boxes (STBs) are used for selecting among channels on a network, such as, for example, a cable television network (e.g., an optical fiber network), to enable content transmitted on those channels to be displayed on display devices (e.g., televisions) connected to the STBs. The STB user may use a remote device to switch channels on the STB, or to provide input for controlling other functions on the STB. The remote device may be used, for example, for controlling the STB's digital video recorder (DVR), for accessing a digital television programming guide, or for turning on or off specific settings on the STBs (e.g., turning on closed captioning, setting display width, etc.). The STB's DVR may include functionality for scheduling the recording of a television program or a series of television programming. For example, the STB's DVR may permit a device user to schedule the weekly recording of the episodes of each of the user's preferred television series.

Some devices, such as STBs and home media servers, support mobility streaming to mobile devices. Transcoders in such devices are used in transcoding content from an existing format that may be suitable for presentation on a television into a format that may be more suitable for presentation on the mobile devices.

DETAILED DESCRIPTION OF THE PREFERRED EMBODIMENTS

The following detailed description refers to the accompanying drawings. The same reference numbers in different drawings may identify the same or similar elements.

Figure 1A:
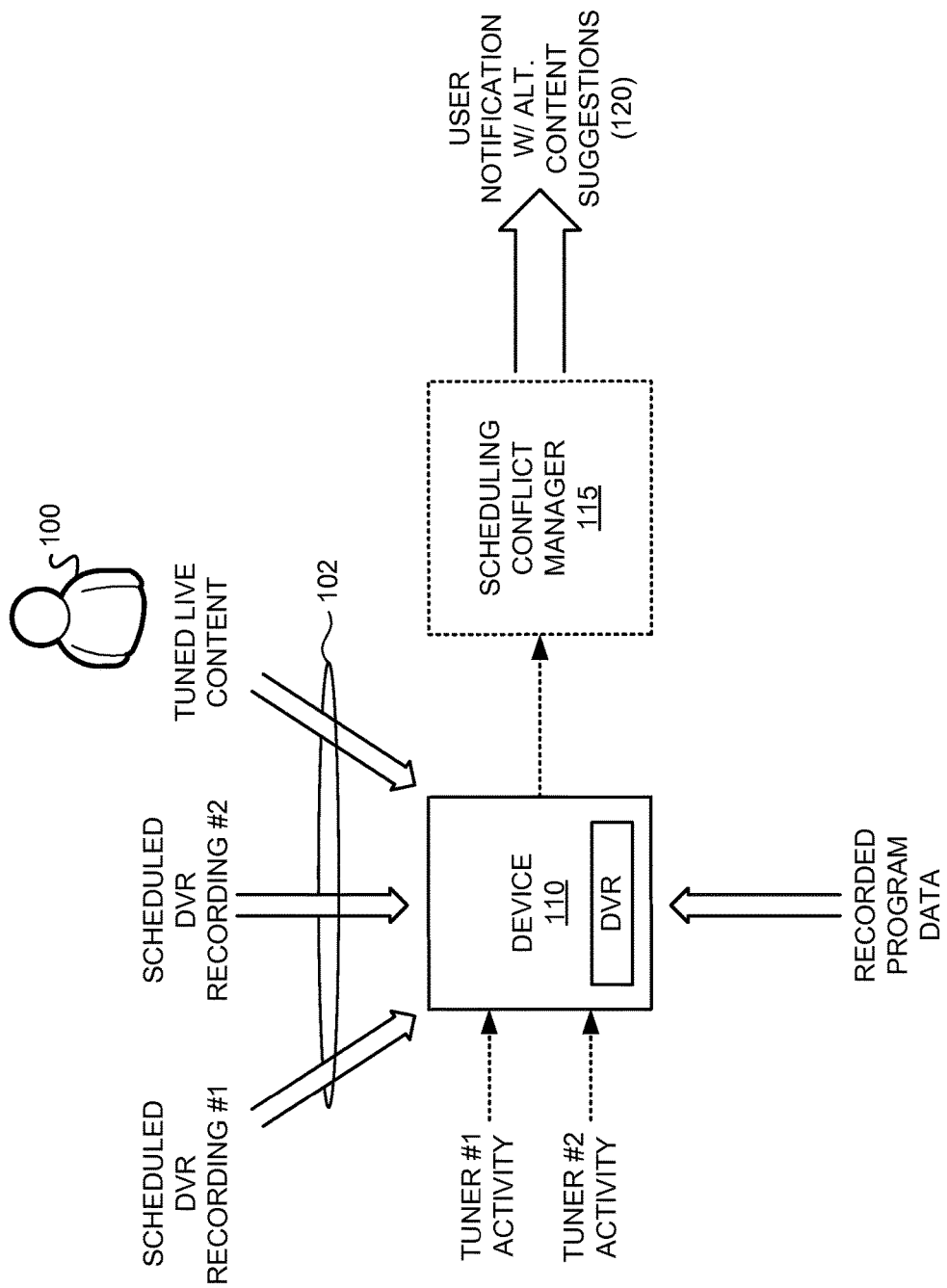
FIG. 1A is a diagram that depicts an overview of DVR tuner conflict resolution according to an implementation described herein.

A DVR tuner conflict arises when a DVR is scheduled to record more programs than a device can support during a given period of time. FIG. 1A is a diagram that depicts an overview of a DVR tuner conflict notification, according to an implementation described herein. As shown in FIG. 1A, a user 100 may interact with a device 110 to engage in DVR scheduling and/or program viewing 102. For example, assume a DVR of a device 110 (such as a STB) has two tuners available for recording programs, and that two programs are scheduled to record during the same period of time that user 100 is watching a third program. A DVR tuner conflict would exist during that period of time, such that at least one of the scheduled recordings will fail to record at the scheduled time.

Device 110 may include one or more devices that may be used for scheduling the recording of programs, such as, for example, an STB (e.g., connected to a television), a media server (e.g., connected to multiple STBs, televisions, or computers), or a stand-alone DVR device. According to systems and methods described herein, a scheduling conflict manager 115 may be included within device 110. Scheduling conflict manager 115 may detect a DVR tuner conflict and provide a conflict notification 120 to user 100. Conflict notification 120, which may be presented to user 100 on a television display or another device, may include tuner conflict resolution options, including a list of recorded content previously recorded for the user. The recorded content options may include local DVR recordings, Over-the-Top (OTT) or Internet-based content, or other content that may be presented without use of the tuners on device 110. Selection of one of the recorded content options allows user 100 to select alternate programming without disrupting the DVR recording schedules. In one implementation, the recorded content options may be provided in a ranked order based on one or more factors relevant to user 100, such as similarities to the currently-tuned (or currently-requested) live TV content (e.g., same genre, similar program length, etc.), age of the record content, user recording priorities, whether the recorded content has been previously watched, and the like.

Thus, according to one implementation, a device may receive a recording schedule for programs to record at a future time and may cause, based on the recording schedule, at least some of the programs to be recorded in the device memory to create recorded content. The device may detect use of the device, by a user, that creates a conflict with the recording schedule. The device may identify alternate content from the recorded content and may present, to the user, a notification of the conflict. The notification may include a list of at least some of the alternate content from the recorded content.

Figure 1B:
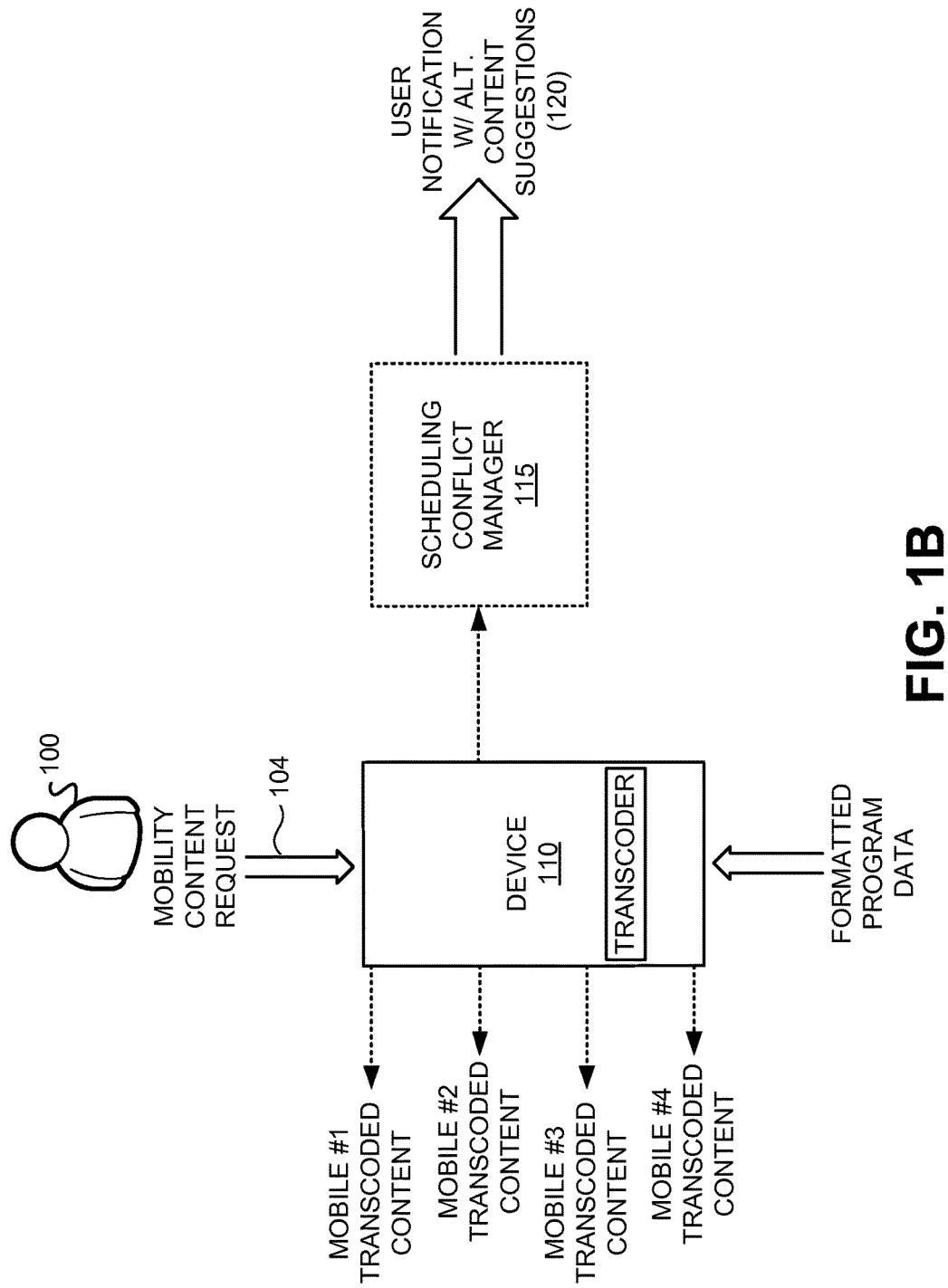
FIG. 1B is a diagram that depicts an overview of transcoding conflict resolution according to another implementation described herein.

A transcoder conflict arises when a device receives more requests to transcode mobile content streams than the device can support at given time. FIG. 1B is a diagram that depicts an overview of a transcoding conflict notification, according to another implementation described herein. As shown in FIG. 1B, user 100 may interact with device 110 to request mobile content 104. For example, assume a transcoder of a device 110 (such as a home media server) capacity to support four transcoded mobile streams, and that four other mobile devices are receiving transcoded content at the time user 100 request mobile content that would require transcoding by device 110. A transcoding conflict would exist for the mobile content request 104, since fulfilling the request would require device 110 to exceed its transcoding capacity.

In the implementation of FIG. 1B, device 110 may include one or more devices that may be used for transcoding content into a format suitable for requesting mobile devices, such as, for example, a media server (e.g., connected to multiple STBs, televisions, mobile devices, and/or computers), or a stand-alone mobile streaming device. Similar to the configuration describe above in FIG. 1A, scheduling conflict manager 115 may be included with device 110. Scheduling conflict manager 115 may detect a transcoder conflict and provide a conflict notification 120 to user 100. Conflict notification 120, which may be presented to user 100 on a mobile device or another device, may include transcoder conflict resolution options, including a list of content that can be presented on the requested mobile device without transcoding. The recorded content options may include previously-formatted mobile content, Over-the-Top (OTT) or Internet-based content, or other content that may be presented without use of a transcoder on device 110. Selection of one of the recorded content options allows user 100 to select alternate programming without disrupting the existing transcoding activities for other mobile content. In one implementation, the recorded content options may be provided in a ranked order based on one or more factors relevant to user 100, such as similarities to the currently-requested content (e.g., same genre, similar program length, etc.), age of the alternate content, user priorities, whether the alternate content has been previously watched, and the like.

Thus, according to another implementation, a device may receive a receive multiple requests, up to a limit of a transcoding capacity of the device, to provide transcoded content streams and may transcode, based on the multiple requests, content for each of the received multiple requests. The device may receive a request, from a user, for additional content that requires transcoding and that exceeds the transcoding capacity of the device. The device may identify a conflict, based on the request and the transcoding activity, and may identify alternate content that can be provided, by the device and to the user, without transcoding. The device may present, to the user, a notification of the conflict along with a listing of the alternate content.

Figure 2:
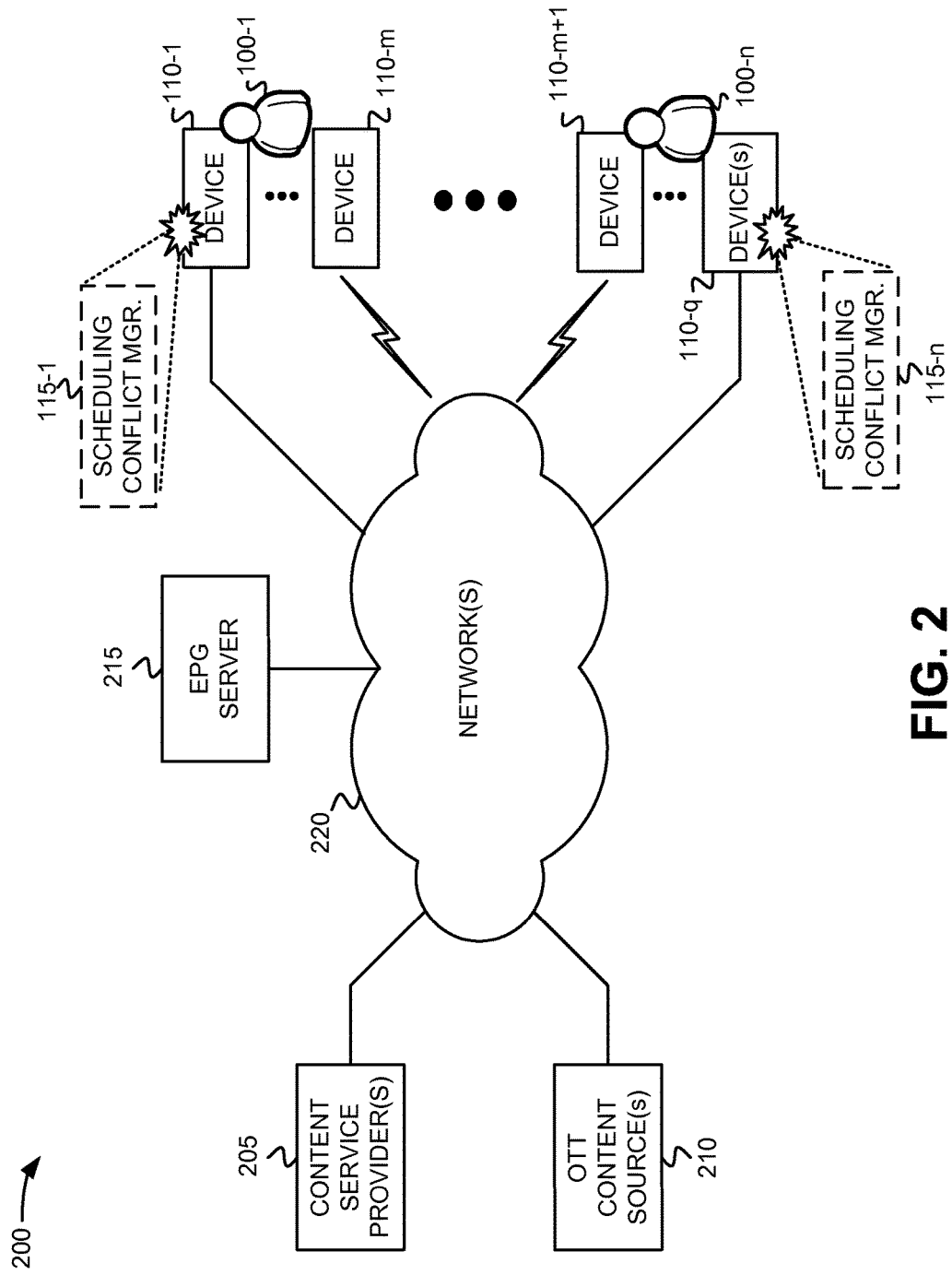
FIG. 2 is a diagram that depicts an exemplary network environment in which conflict resolution may be implemented at various different devices that include DVR functionality and/or transcoding functionality.

FIG. 2 is a diagram that depicts an exemplary network environment 200 in which conflict resolution may be implemented at various different devices that include DVR functionality and/or transcoding functionality. As shown in FIG. 2, network environment 200 may include a content service provider(s) 205, an Over-the-Top (OTT) content source(s) 210, EPG server 215, one or more devices 110-1 through 110-$m$ (where m is greater than or equal to one) associated with a first user 100-1, one or more devices 110-$m$+1 through 110-$q$ (where q is greater than, or equal to, m+1), and a network 220.

Content service provider(s) 205 may include one or more devices, or a network of devices, that deliver content to devices 110-1 through 110-$q$. Content service provider(s) 205 may deliver the content to devices 110-1 through 110-$q$ via one or more channels (e.g., Quadrature Amplitude Module (QAM) channels) over network(s) 220. The content may include, for example television video programs.

OTT content source(s) 210 may include one or more network devices that may deliver content to devices 110-1 through 110-$q$ via OTT services. An OTT service, as referred to herein, is a service, which is utilized over a network that is not offered by the network operator of that network. An OTT service, as referred to herein, is, thus, a service that rides on top of an existing network service and may not require any business or technology affiliations with the network operator. According to implementations described herein, OTT services may be received by devices 110 without the use of dedicated tuners (e.g., QAM tuners).

EPG server 215 may deliver EPG data that includes various data related to the display of an electronic program guide at devices 110-1 through 110-$n$ via network 220. An "electronic program guide," as referred to herein, includes menus of television program scheduling information that are shown by a content service provider (e.g., cable or satellite TV provider) to its users and that display current and upcoming television programming. EPGs enable the user to identify desired programming using interactive menus and, if DVR functionality is present in the user's system, may permit the user to schedule the recording of desired programming via the EPG. EPG data may also include information (e.g., metadata) about available programming, such as genre, actors, ratings (television content rating, MPAA ratings), etc.

As shown, one of devices 110-1 through 110-$m$ may include DVR conflict resolution functionality (e.g., scheduling conflict manager 115-1) that may resolve scheduling conflicts for a DVR that records programs based on scheduling instructions from user 100-1. Additionally, or alternatively, one of devices 110-$m$+1 through 110-$q$ may include transcoding confliction resolution functionality (e.g., scheduling conflict manager 115-$n$) for a transcoder that provides transcoded media stream in response to instructions from user 100-$n$.

Network(s) 220 may include one or more networks of various types including, for example, a cable network (e.g., an optical cable network), a satellite network, a telecommunications network (e.g., a Public Switched Telephone Network (PSTN) or Public Land Mobile Network (PLMN)), an Advanced Television Systems Committee (ATSC) standards network, a local area network (LAN), a wide area network (WAN), a metropolitan area network (MAN), an intranet, and/or the Internet. Network(s) 220 may, in some implementations, include one or more QAM channels (or other types of modulated or broadcast channels) for delivering content and EPG data to devices 110-1 through 110-$q$.

The configuration of network components of network environment 200 illustrated in FIG. 2 is for illustrative purposes only. Other configurations may be implemented. Network environment 200 may include additional, fewer and/or different components than those depicted in FIG. 2.

Figure 3B:
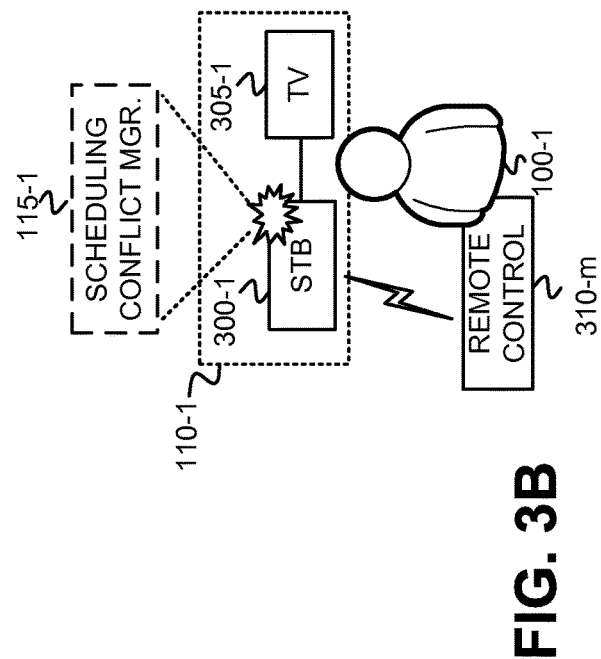
FIGS. 3A and 3B depict examples of the network environment of FIG. 2, where the devices include different types of devices.
Figure 3A:
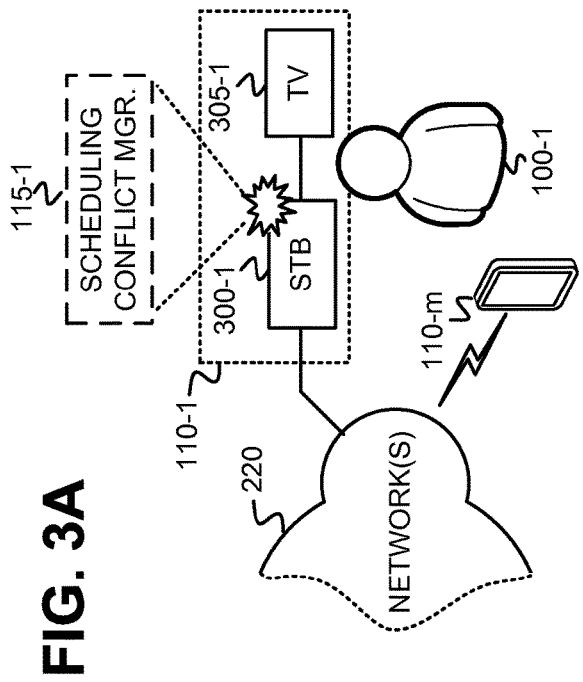

FIGS. 3A and 3B depict examples of network environment 200 of FIG. 2 where devices 110-1 through 110-$m$ include different types of devices. For example, as shown in the example of FIG. 3A, device 110-1 includes a STB 300-1 and an associated television (TV) 305-1, and device 110-$m$ includes a cellular telephone (e.g., a smartphone), a tablet computer, or a personal digital assistant (PDA) having a wireless connection to network 220. In this implementation, user 100-1 may interact with STB 300-1 and TV 305-1 via a remote control device (not shown) to schedule the recording of programs. STB 300-1 may include a device that, among other components, includes a discrete number of tuners and connects to TV 305-1. STB 300-1 may receive an external source of signal (e.g., content from content service provider(s) 205 via network(s) 220) and may turn the signal into content that is displayed on TV 305-1, or another type of display device. User 100-1 may also interact with cellular telephone 110-$m$ to schedule the recording of programs, to view content through STB 300-1 in a mobile environment, and/or to respond to conflict notifications (e.g., conflict notification 120) generated by STB 300-1.

In another example shown in FIG. 3B, device 110-1 includes STB 300-1 and television (TV) 305-1, and device 110-$m$ includes a remote control device 310. In this implementation, user 100-1 may interact with STB 300-1 and TV 305-1 via remote control device 310 to schedule the recording of programs and to respond to conflict notifications (e.g., conflict notification 120) generated by STB 300-1. User 100-1 may also interact with device 110-*m* to schedule the recording of programs.

Figure 4:
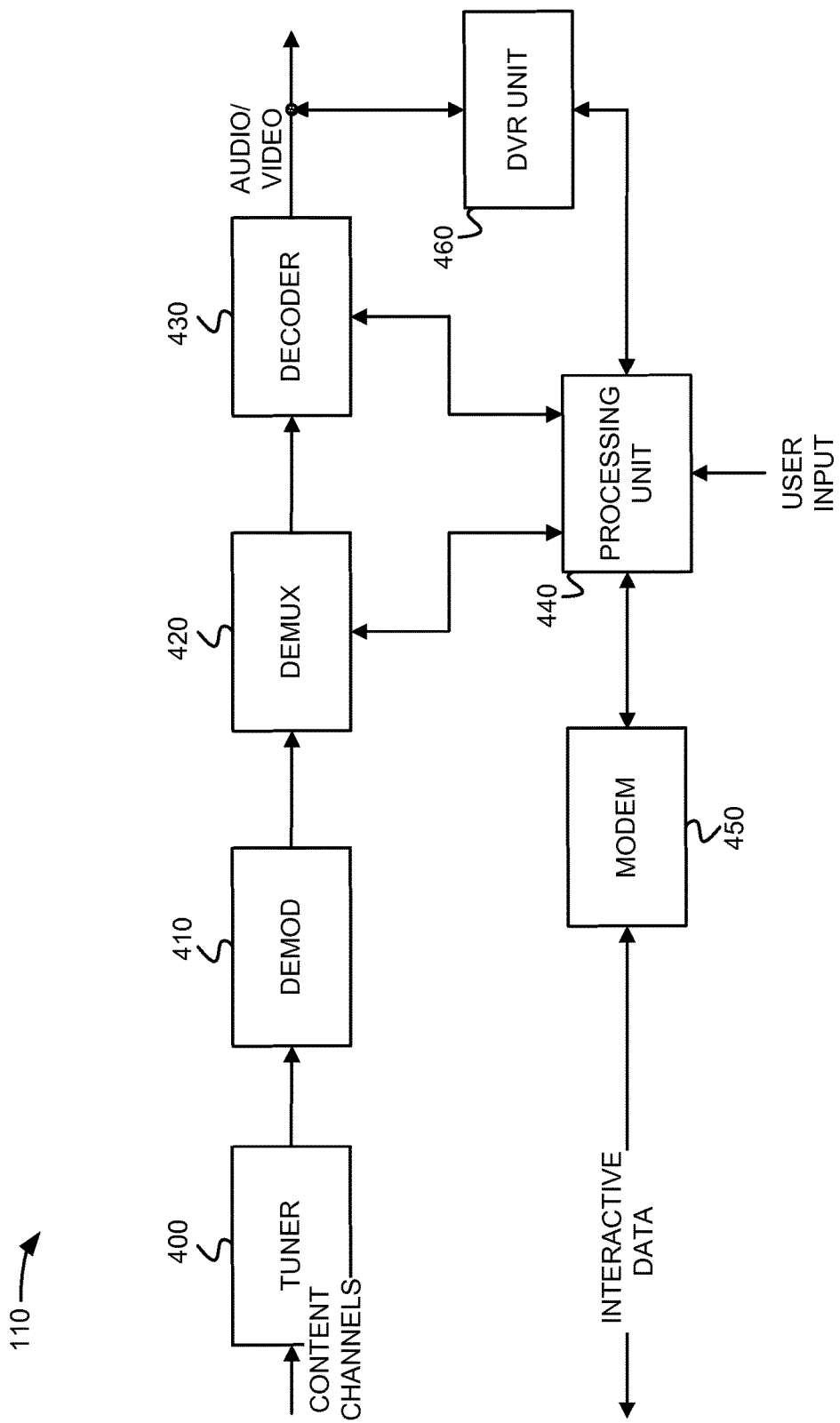
FIG. 4 depicts exemplary components of a device of FIG. 1A or 1B, where the device is implemented as a set-top box.

FIG. 4 depicts exemplary components of device 110, where device 110 is implemented as STB 300. Device 110 may include one or more tuners 400, a demodulator 410, a demultiplexer 420, a decoder 430, a processing unit 440, a modem 450, and a DVR unit 460. Tuner 400 may select and tune to specific broadcast television information by tuning to one of many different input channels. Each channel may be digitally modulated using, for example, QAM, though other types of modulation may be used. Demodulator 410 may demodulate the information in the channel selected by tuner 400 to produce a transport stream (e.g., MPEG-2 or MPEG-4 transport stream) containing the audio, video and/or other information related to a selected TV program.

Demultiplexer 420 may select and decrypt compressed audio and video from the transport stream for the particular TV program that the device user wishes to watch. Decoder 430 may decode and decompress the decrypted audio and video information for the selected TV program. Processing unit 440 may include, for example, a microprocessor that controls the operations performed by tuner 400, demodulator 410, demultiplexer 420, decoder 430, modem 450, and DVR unit 460 based on user input (e.g., input received from a device user 100 via a remote control device). Modem 450 may send and receive interactive data (e.g., EPG data) that may be processed by processing unit 440. DVR unit 460 may digitally record, and store, audio and video content associated with the particular TV program decoded by decoder 430.

The configuration of components of device 110 in FIG. 4 is for illustrative purposes only. Other configurations may be implemented. Device 110 may include additional, fewer and/or different components than those depicted in FIG. 4.

Figure 5:
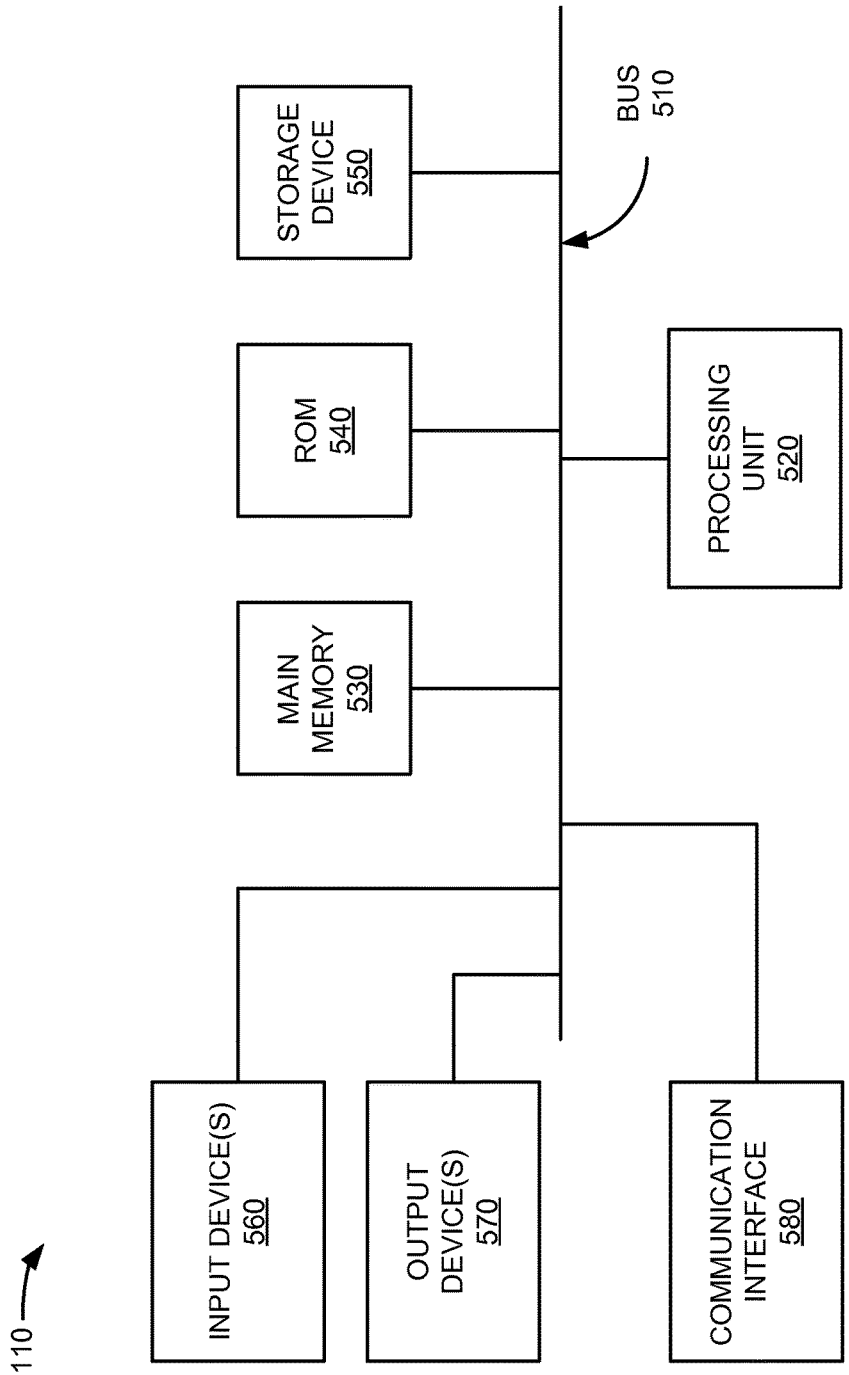
FIG. 5 is a diagram of exemplary components of the device of FIG. 1A or 1B, where the device is implemented as a computer, a personal digital assistant, or a cellular telephone.

FIG. 5 is a diagram of exemplary components of device 110, where device 110 is implemented as a computer (e.g., desktop, laptop, palmtop or tablet computer), a PDA, or a cellular telephone (e.g., a smartphone). Content service provider(s) 205, OTT content source(s) 210, and EPG server 215 may be similarly configured. Device 110 may include a bus 510, a processing unit 520, a main memory 530, a read only memory (ROM) 540, a storage device 550, an input device(s) 560, an output device(s) 570, and a communication interface 580. Bus 510 may include a path that permits communication among the elements of device 110.

Processing unit 520 may include one or more processors or microprocessors, or processing logic, which interprets and executes instructions. Main memory 530 may include a random access memory (RAM) or another type of dynamic storage device that stores information and instructions for execution by processing unit 520. ROM 540 may include a ROM device or another type of static storage device that stores static information and instructions for use by processing unit 520. Storage device 550 may include a magnetic and/or optical recording medium. Main memory 530, ROM 540, and storage device 550 may each be referred to herein as a "tangible non-transient computer-readable medium."

Input device 560 may include one or more mechanisms that permit user 100 to input information to device 110, such as, for example, a keypad or a keyboard, a display with a touch sensitive panel, voice recognition and/or biometric mechanisms, etc. Output device 570 may include one or more mechanisms that output information to user 100, including a display, a speaker, etc. Communication interface 580 may include any type of transceiver that enables device 110 to communicate with other devices and/or systems. For example, communication interface 580 may include wired or wireless transceivers for communicating via network(s) 220.

The configuration of components of device 110 in FIG. 5 is for illustrative purposes only. Other configurations may be implemented. For example, in some implementations, device 110 may be configured as a media server that incorporates features of both FIG. 4 and FIG. 5 in a single device. Thus, device 110 may include additional, fewer and/or different components than those depicted in FIG. 5.

Figure 6:
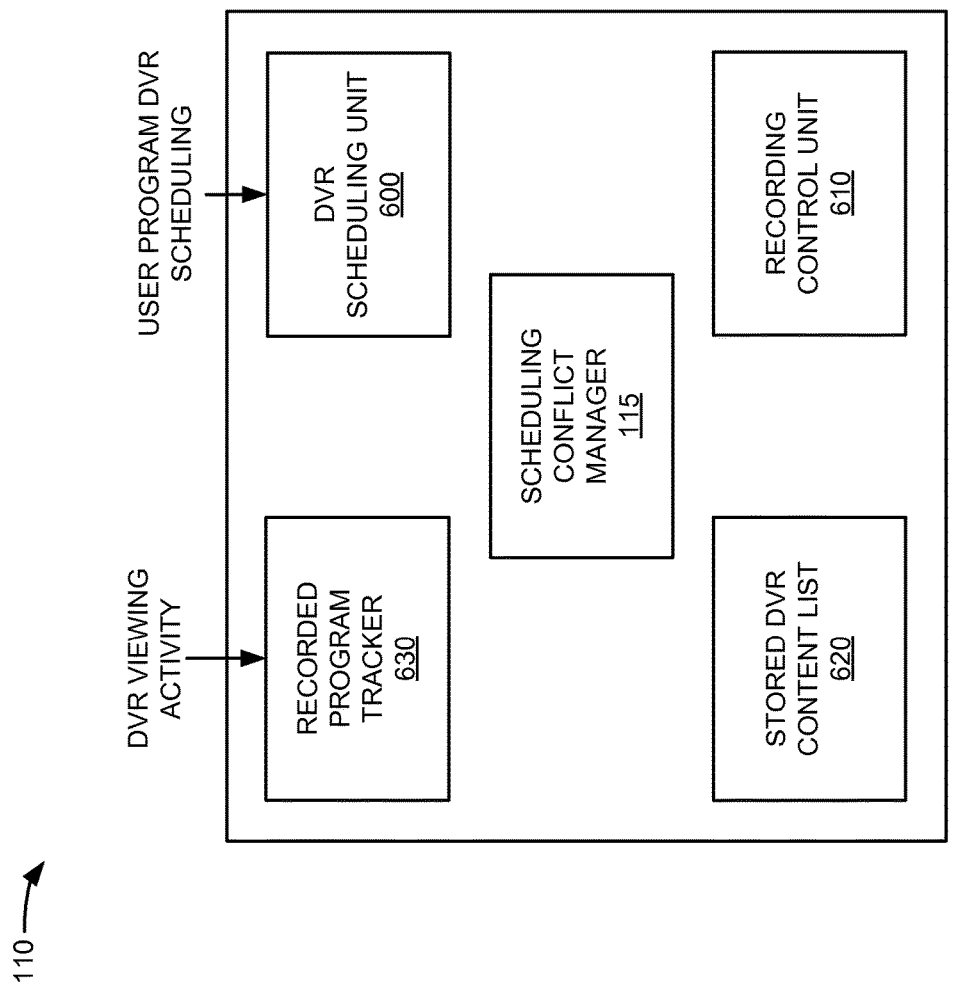
FIG. 6 is a diagram of exemplary functional components of the device of FIG. 1A or 1B.

FIG. 6 is a diagram of exemplary functional components of device 110. The functional components shown in FIG. 6 may be implemented in hardware and/or software within device 110. For example, in one implementation, the functional components of FIG. 6 may be implemented as instructions stored in memory 530 that are executed by processing unit 520 (or processing unit 440 and/or DVR unit 460). The functional components of device 110 may include a DVR scheduling unit 600, recording control unit 610, a stored DVR content list 620, a recorded program tracker 630, and scheduling conflict manager 115.

DVR scheduling unit 600 may receive user input to schedule DVR recordings. For example, DVR scheduling unit 600 may provide a user interface to allow a user to input (e.g., via remote control) schedule a single program/event recording or a recording schedule for a series of programs. In one implementation, DVR scheduling unit 600 may supply program scheduling instructions to scheduling conflict manager 115.

Recording control unit 610 may implement instructions from DVR scheduling unit 600 and/or scheduling conflict manager 115 to execute recording instructions on available tuners. Recordings executed by recording control unit 610 may be stored, for example, in a local storage device of device 110, a storage device associated with content service provider 205, a storage device associated with OTT content source 210, or another memory component. In one implementation, recording control unit 610 may identify if use of a tuner (e.g., by a user watching live television) conflicts with execution of scheduled DVR recordings. For example, recording control unit 610 may receive instructions to record two different programs at the same time (e.g., using both available tuners 400 of device 110). Just prior to the recording time, one of the tuners may be committed to presenting live television content on a different channel, thus creating a potential conflict. If a potential conflict is detected, recording control unit 610 may send a potential conflict signal to scheduling conflict manager 115. As another example, recording control unit 610 may be using both tuners to perform scheduled DVR recordings when a user turns on a television and/or tunes to a channel that requires use of a tuner.

Stored DVR content list 620 may include a list of recorded programs available through device 110. In one implementation, stored DVR content list 620 may include a list of recordings completed by recording control unit 610 and stored locally on device 110. In another implementation, stored DVR content list 620 may include a list of recordings or other items available for OTT delivery (e.g., available via a network without use of tuners 400). Stored DVR content list 620 may include content identifiers (e.g., program titles, recording dates, etc.) along with other metadata indicating features associated with each content item, such as genre, actors, ratings (television content rating, MPAA ratings), program length, etc.

Recorded program tracker 630 may monitor user consumption of DVR recordings. For example, recorded program tracker 630 may track whether a particular DVR recording has been viewed. In another implementation, recorded program tracker 630 may track whether a particular DVR recording has been viewed by a particular user. For example, based on an account login, recorded program tracker 630 may determine if a particular user in a household has watched a particular DVR recording from stored DVR content list 620. In one implementation, recorded program tracker 630 may log, in stored DVR content list 640, if (and/or by whom) a DVR recording has been viewed.

Scheduling conflict manager 115 may identify the occurrence of tuner conflicts (e.g., more programs to record/present over a given time period that can be served by the number of tuners in device 110). To identify a conflict, scheduling conflict manager 115 may, for example, receive program scheduling instructions from DVR scheduling unit 600 and/or a potential conflict signal from recording control unit 630. When a tuner conflict is identified, scheduling conflict manager 115 may provide a conflict notification (e.g., conflict notification 120) with conflict resolution options for the user, including a list of unwatched alternate content that has not been watched by the user. In one example, scheduling conflict manager 115 may generate user interfaces described below in connection with FIGS. 7A-7D.

To generate the conflict notification, scheduling conflict manager 115 may retrieve a list of unwatched recordings from stored DVR content list 620 that may be a suitable replacement for the live television content that is causing the tuner conflict with the scheduled DVR recordings. In one implementation, scheduling conflict manager 115 may select a subset of unwatched content from stored DVR content list 620. The subset may be selected based on, for example, metadata of the live television content and metadata of items in the stored DVR content list 620. For example, scheduling conflict manager 115 may match (e.g., between the conflicting live television content and the items in stored DVR content list 620) genres, content ratings, actors, or other information to generate a subset of unwatched content from stored DVR content list 620.

Scheduling conflict manager 115 may present the list of unwatched alternate content with the conflict notification and solicit user input to either avoid the conflict or approve of a default conflict action (e.g., to not record a scheduled DVR recording). In one implementation, scheduling conflict manager 115 may present the list of unwatched alternate content simultaneously with the conflict notification. In another implementation, as described further in connection with FIG. 7D, scheduling conflict manager 115 may present the list of alternate content as a tiered or layered selection process after the conflict notification. Selection of one of the recorded content options allows the user to select alternate programming without disturbing the DVR recording schedules.

Scheduling conflict manager 115 may provide the recorded content options in a ranked order based on one or more factors relevant to the user, such as similarities to the currently tuned live television content (e.g., same genre, similar program length, etc.), age of the unwatched recording, user recording priorities, and the like. For example, scheduling conflict manager 115 may identify features of the program associated with a tuning request (or an ongoing program that is projected to conflict with the DVR recording schedule) and identify features of particular recorded content. Based on the features of the program and the features of the particular recorded content, scheduling conflict manager 115 may determine a best match or group of closest matches to present with conflict notification 120.

As described above, in connection with FIG. 1B, implementations described herein may also apply to conflict notifications in a mobility context. For example, in another implementation, recording control unit 610 (or another functional component of device 110) may identify a conflict when a mobile device (e.g., smartphone 110-m) requests streamed content that exceeds a transcoding capacity of device 110. A capacity of device 110 may be exceeded, for example, when a content request from smartphone 110-m requires use of a transcoder, by device 110, to provide mobile streaming of television content during a time when all available transcoding capacity is committed to other activities. In such a context, scheduling conflict manager 115 may suggest alternate content, which does not require transcoding, from the local DVR (device 110), local storage of smartphone 110-m, or another device.

In still another implementation, scheduling conflict manager 115 may suggest canceling a scheduled DVR recording to resolve a pending DVR tuner conflict. For example, scheduling conflict manager 115 may identify if one or more scheduled DVR recordings is available to the user without a DVR recording. Scheduling conflict manager 115 may communicate, for example, with OTT content source 210 or EPG server 215 (FIG. 2) to identify if a particular program associated with a DVR tuner conflict will be available to a user as OTT content. In one implementation, scheduling conflict manager 115 may identify subscriptions/services through which the user has access to on-demand content to determine if a particular program is available on-demand. If the particular program is available on-demand, scheduling conflict manager 115 may provide a suggestion to the user that tuning of live television (and canceling the scheduled DVR recording) can continue without risk of losing access to content of the scheduled DVR recording.

FIGS. 7A-7D depict diagrams of an exemplary user interface 700 for conflict notification 120 that is capable of being generated by device 110 (e.g., scheduling conflict manager 115). User interface 700 may include a graphical user interface (GUI) or a non-graphical user interface, such as a text-based interface. User interface 700 may receive user inputs via one or more input devices (e.g., remote control 310, cellular phone 110-m, keyboard, etc.), may be user-configurable (e.g., a user may change the size of the user interfaces; information displayed in the user interfaces; color schemes used by the user interfaces; positions of text, images, icons, windows, etc., in the user interfaces; etc.). The user interfaces may be displayed to a user via one or more output devices (e.g., TV 305).

Figure 7A:
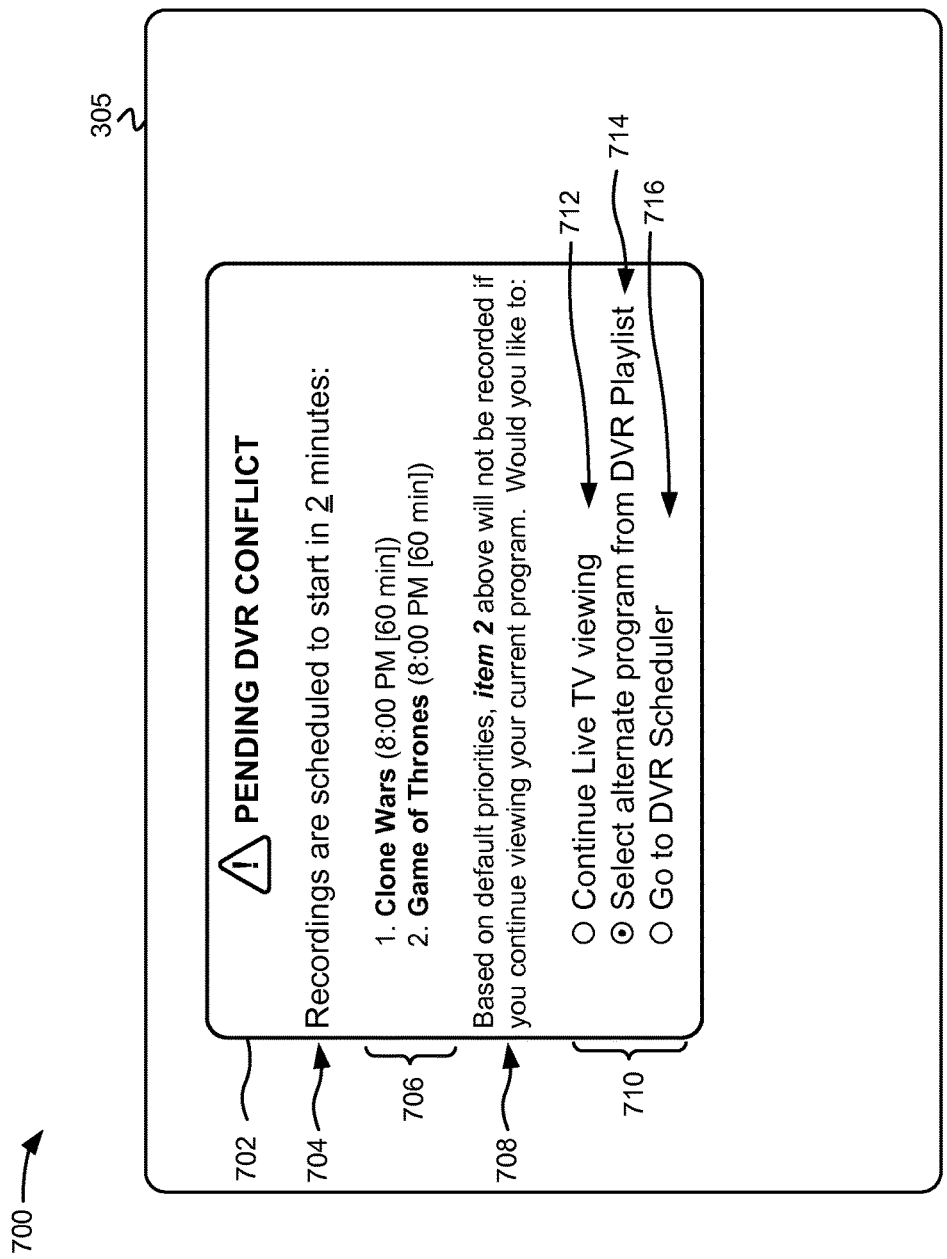
FIGS. 7A-7D are diagrams of exemplary DVR user interfaces capable of being generated by the device depicted in FIG. 1A.
Figure 7B:
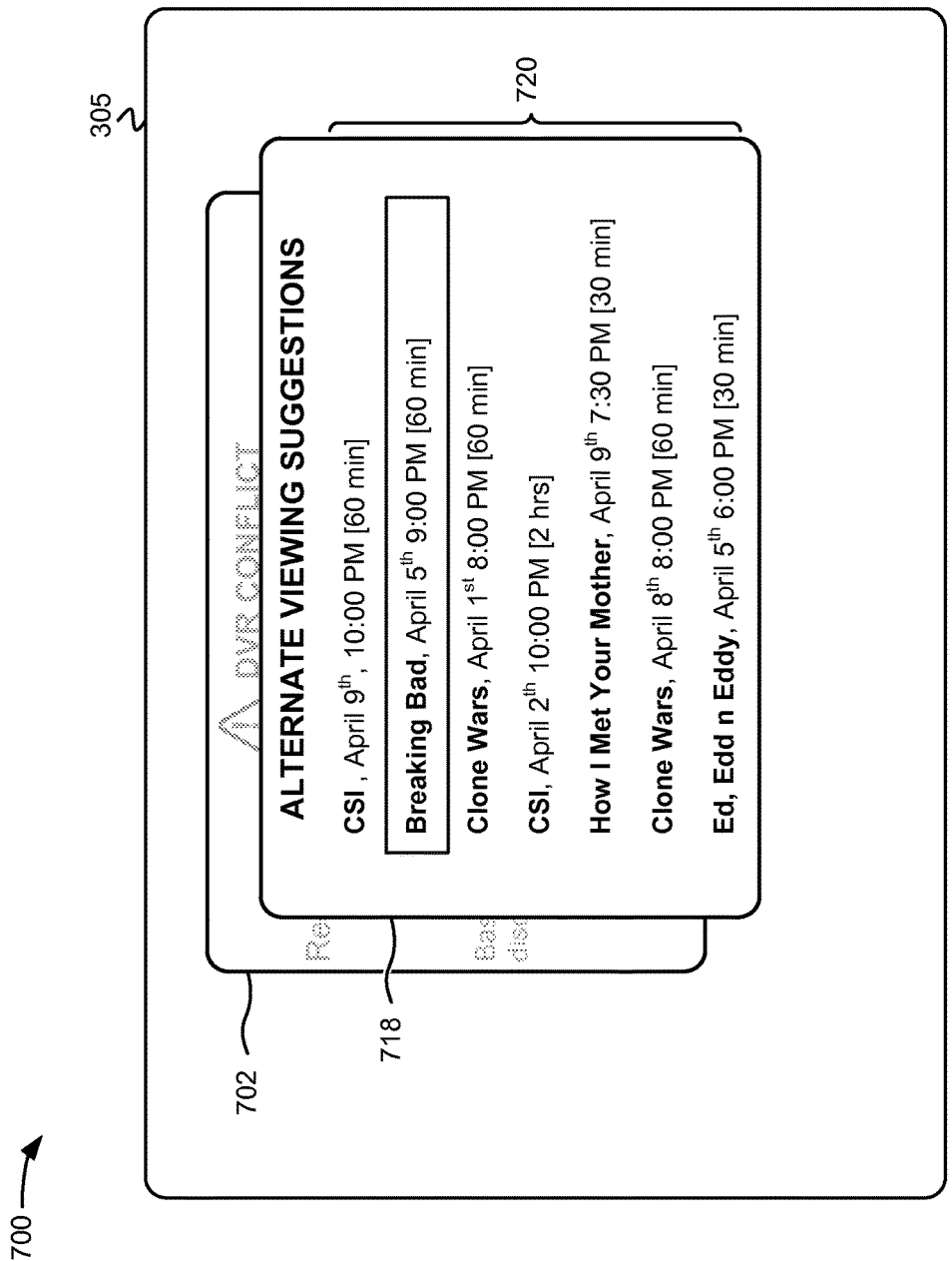

As illustrated in FIG. 7A, a user interface 700 may include a notification window 702 that provides an indication of a pending DVR conflict. Notification window 702 may be presented, for example, when a user is tuned to a channel that would create a DVR tuner conflict if the user remains tuned to that channel. Notification window 702 may include a timeframe indication section 704 (e.g., "recordings are scheduled to start in 2 minutes"). Timeframe indication section 704 may indicate an amount of time leading up to a conflict (e.g., 2 minutes), a current conflict, and/or a duration of a conflict (e.g., the amount of time all tuners are committed to recordings and, thus, preventing use of live television viewing via the tuners without a conflict).

Notification window 702 may also include conflict details section 706. Conflict details section 706 may identify particular DVR commitments (e.g., scheduled recordings) that create a DVR tuner conflict. For example, as shown in FIG. 7A, conflict details section 706 may identify particular programs, times, and program durations for scheduled DVR recordings.

Notification window 702 additionally may include a default conflict action section 708. Default conflict action section 708 may identify, for the user, a default conflict resolution action(s) that may be taken by device 110 (e.g., scheduling conflict manager 115). For example, as shown in FIG. 7A, default conflict action section 708 may identify a particular program (e.g., "item 2," Game of Thrones) that will not be recorded if device 110 remains tuned to the current program.

Notification window 702 may further include a user input section 710. User input section 710 may include options (e.g., options 712, 714, and 716) that a user may select to resolve the pending DVR conflict. For example, option 712 may include a user option to continue viewing live television (e.g., using one of the tuners for device 110) at use the default conflict resolution action(s).

Option 714 may allow a user to select alternative recorded programs that can be viewed without disrupting the scheduled DVR recordings. For example, selection of option 714 may cause device 110 (e.g., scheduling conflict manager 115) to present alternate viewing suggestions window 718 of FIG. 7B. Alternate viewing suggestions window 718 may include a list of previous DVR recordings 720. In one implementation, the list of previous DVR recordings 720 may include only items that have not been watched by the user. In another implementation, the list of previous DVR recordings 720 may include a combination of previously viewed and unwatched content. The list of previous DVR recordings 720 may be provided in a ranked order based on one or more factors relevant to the user, such as similarities to the currently tuned linear content (e.g., same genre, similar program length, same content rating, etc.), age of the recording, user recording priorities (e.g., scheduling conflict-resolution priorities), etc.

In one implementation, scheduling conflict manager 115 may rank items in the list of previous DVR recordings 720 based on corresponding features of a program that the user intended to tune to and the listing of unwatched content. Corresponding features may be identified, for example, based on data/metadata from DVR scheduling unit 600, stored DVR content list 620 and/or recorded program tracker 630. In another implementation, scheduling conflict manager 115 may rank items in the list of previous DVR recordings 720 based on data from other stored user preferences and/or profiles. Selection (by a user) of a particular item from the list of previous DVR recordings 720 may cause device 110 (e.g., scheduling conflict manager 115) to present the selected program item without disruption of the scheduled DVR recordings (e.g., as shown in conflict details section 706).

Returning to FIG. 7A, user input section 710 may also include an option 716 to navigate to a DVR scheduler to manually resolve the DVR conflict. For example, selection of option 716 may cause device 110 (e.g., DVR scheduling unit 600) to present a DVR scheduling user interface.

Figure 7C:
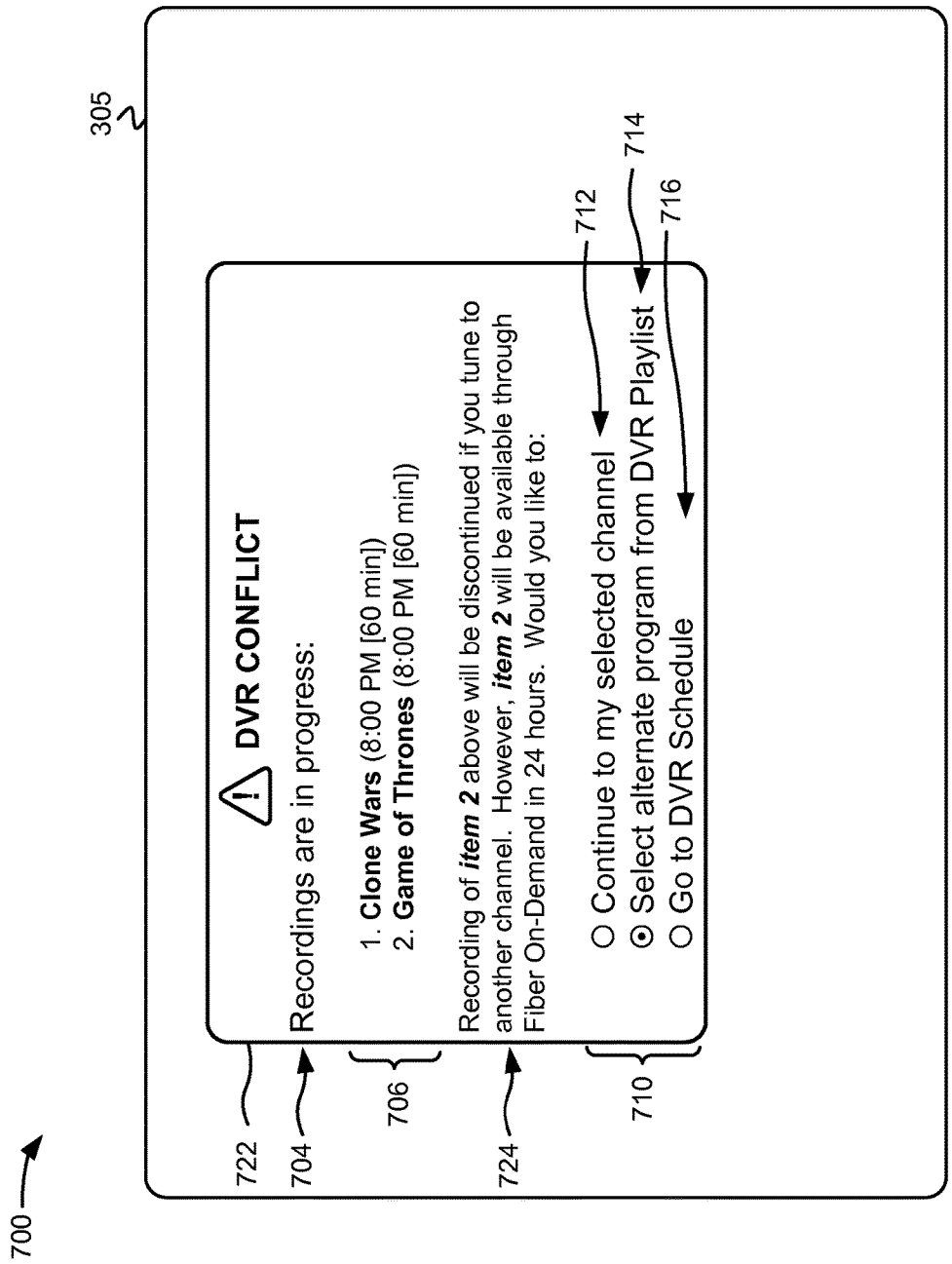

FIG. 7C shows a notification window 722 of user interface 700 that provides an indication of a present DVR conflict. Notification window 722 may be presented, for example, when a user attempts to tune to a channel that would create a DVR tuner conflict if the user tunes tuned to that channel (e.g., while DVR recording are already in progress). Notification window 722 may include indication section 704, conflict details section 706, user input section 710, and a default conflict action section 724. Indication section 704, conflict details section 706, and user input section 710 may include information similar to that described above in connection with FIG. 7A. However, notification window 722 may be presented before a user tunes to a channel (or performs another action) that would cause a conflict with ongoing DVR recordings. Thus, in the instance of notification window 722, device 110 may not act on a particular tuning command that results in a DVR tuner conflict until device 110 (e.g., scheduling conflict manager 115) has received input into user input section 110. Additionally, in one implementation described above in connection with FIG. 6, default conflict action section 724 may also include information that identifies if content of a scheduled DVR recording is available to the user without a DVR recording (e.g., "item 2 will be available through Fiber On-Demand in 24 hours").

Figure 7D:
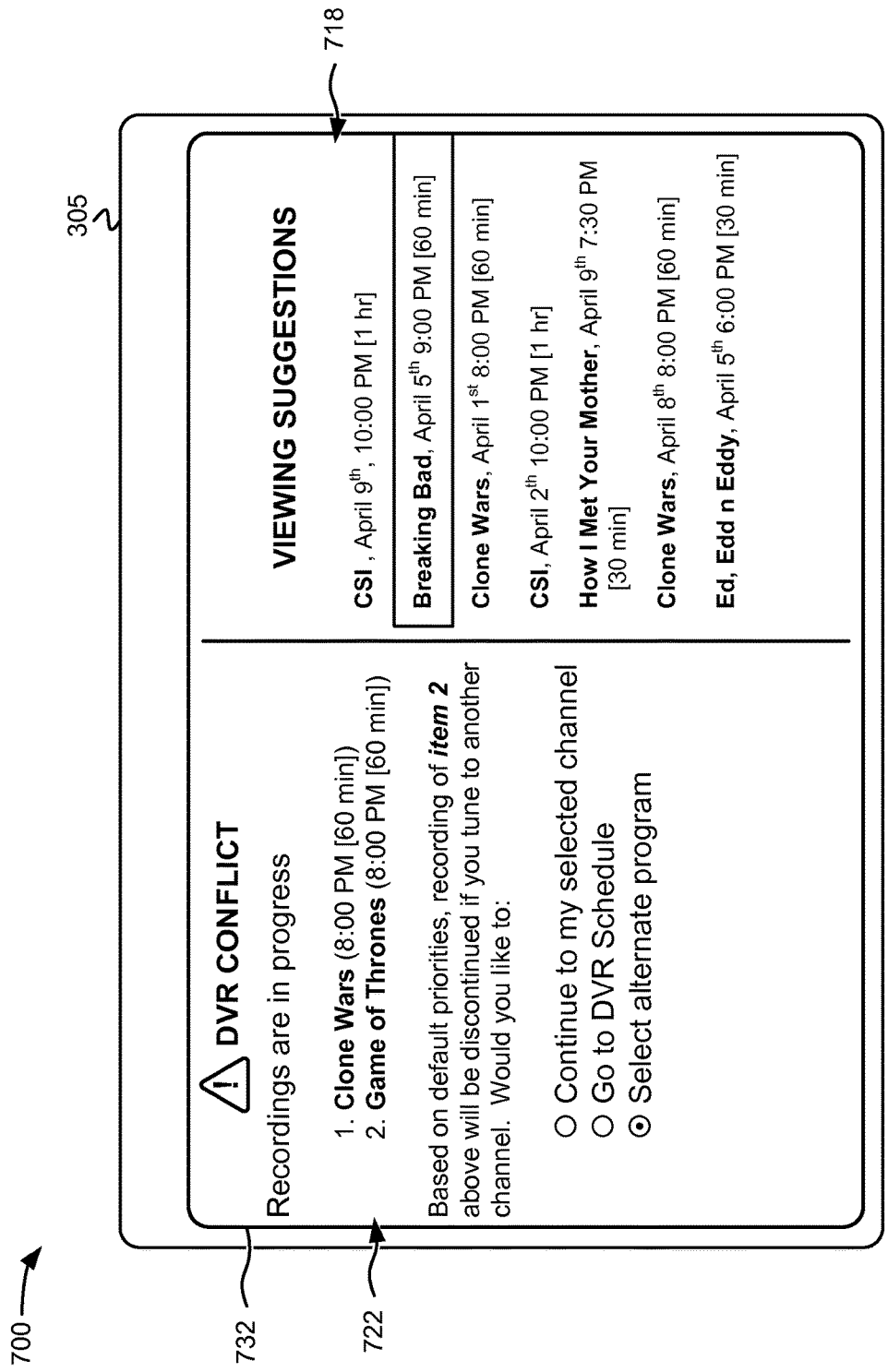

FIG. 7D shows a notification window 732 of user interface 700 that provides a combined presentation of notification window 722 and alternate viewing suggestions window 718. Thus, in the configuration of FIG. 7D, alternate content a list of previous DVR recordings 720 that have not been watched by the user may be presented simultaneously with a DVR conflict notification. In another implementation, notification window 732 may include a combined presentation of notification window 702 and alternate viewing suggestions window 718.

Although FIGS. 7A-7D depict a variety of user interfaces 700, in other implementations, user interfaces 700 may depict more, less, different and/or differently-arranged information than depicted in FIGS. 7A-7D. In another implementation, interfaces similar to user interfaces 700 may be used to present transcoder conflict notifications for mobile devices.

Figure 8:
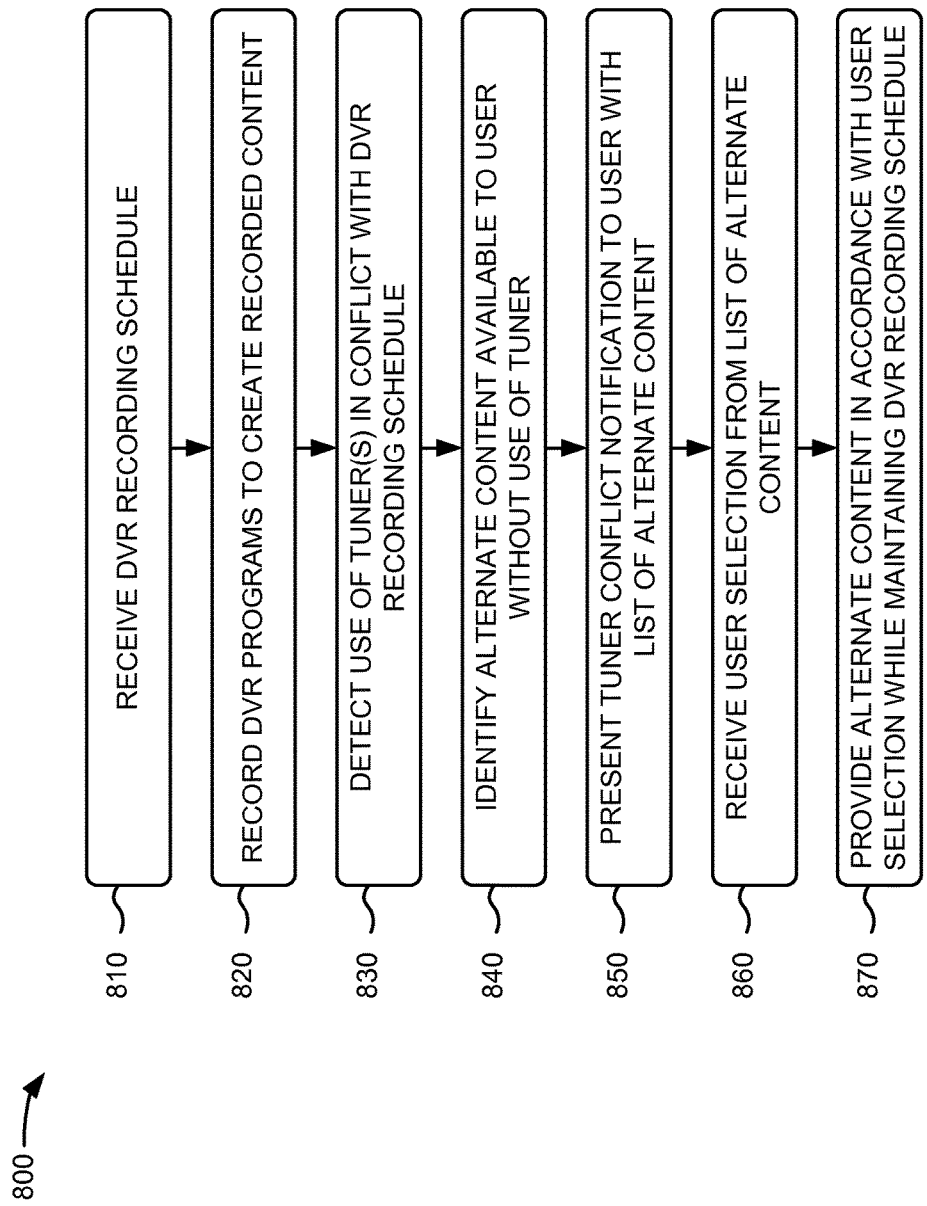
FIGS. 8 and 9 are flow diagrams that illustrate an exemplary process for generating a conflict notification with suggested alternate content according to an implementation described herein.

FIG. 8 is a flow diagram that illustrates an exemplary process 800 for generating a DVR tuner conflict notification with suggested alternate content. In one implementation, the process 800 may be implemented by device 110. In another implementation, process 800 may be implemented by device 110 in conjunction with one or more other devices.

Process 800 may include receiving a DVR recording schedule (block 810), and recording DVR programs to create recorded content (block 820). For example, device 110 (e.g., DVR scheduling unit 600) may receive user input to schedule DVR recordings. Device 110 (e.g., recording control unit 610) may execute recording instructions on available tuners. Recorded programs may be stored in a local storage device (e.g., a hard drive) associated with device 110 or in a storage location accessible via a network (e.g., network 220). Information about the recorded programs (e.g., program titles, recording dates, genre, actors, ratings, etc.) may be stored in stored DVR content list 620.

Process 800 may further include detecting use of one or more tuners in conflict with the DVR recording schedule (block 830) and identifying alternate content available to the user without use of tuner (block 840). For example, device 110 (e.g., scheduling conflict manager 115) may identify the occurrence of tuner conflicts (e.g., more programs to record/present over a given time period that can be served by the number of tuners in device 110). To identify a conflict, scheduling conflict manager 115 may, for example, receive program scheduling instructions from DVR scheduling unit 600 and/or a potential conflict signal from recording control unit 630. When a tuner conflict is identified, scheduling conflict manager 115 may generate a conflict notification (e.g., conflict notification 120) with conflict resolution options for the user, including a list of alternate content that has not been watched by the user. To generate the conflict notification, scheduling conflict manager 115 may retrieve a list of recordings from stored DVR content list 620 that may be a suitable replacement for the live television content that is causing the tuner conflict with the scheduled DVR recordings. Suitable replacement content may include, for example, content within the same genre, with the same actors, from the same series, having the same duration, that was not previously viewed, etc.

Process 800 may additionally include presenting a tuner conflict notification to user along with a list of alternate content (block 850). For example, user device 110 may present a conflict notification user interface (e.g., user interface 700) to indicate that a conflict (or potential tuner conflict) exists between the DVR recording schedule and current program viewing by the user. The conflict notification user interface may include a conflict notification window (e.g., conflict notification window 702/722) and a list of previous DVR recordings 720 that have can watched by the user without disrupting the DVR recording schedule. In one implementation, device 110 may identify features of content associated with a user's tuning selection (e.g., what is being shown on the user's selected channel at the time of the tuner conflict) and match some of those features with features of content in the list of previous DVR recordings 720 that have not been watched by the user. Device 110 may rank some or the entire list of previous DVR recordings 720 based on the best match of features.

Process 800 may also include receiving a user selection from the list of alternate content (block 870) and providing the alternate content in accordance with user selection while maintaining DVR recording schedule (block 880). For example, a user may select (e.g. via remote control 310) an item from the list of previous DVR recordings 720 that have not been watched by the user. The selection (by the user) of the item from the list of previous DVR recordings 720 may cause device 110 to present the selected program item without disruption of the scheduled DVR recordings.

Figure 9:
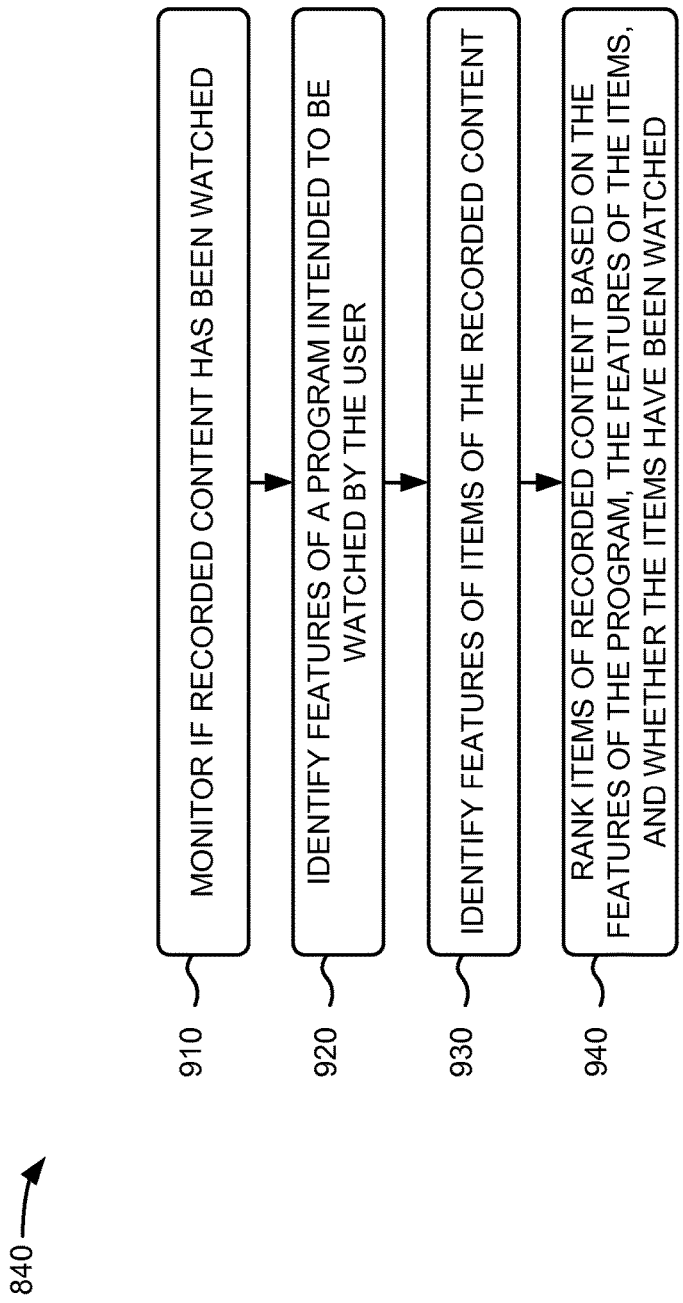

Block 840 of process 800 may include the additional blocks shown in FIG. 9. As shown in FIG. 9, process block 840 may include monitoring whether recorded content has been watched (block 910). For example, device 110 (e.g., recorded program tracker 630) may monitor user consumption of recorded programs. In one implementation, recorded program tracker 630 may determine whether a particular DVR recording has been viewed by any user. In another implementation, recorded program tracker 630 may track whether a particular DVR recording has been viewed by a particular user. Instances of a user viewing recorded programs may be logged, for example, in DVR content list 620.

Process block 840 may also include identifying features of a program intended to be watched by the user (block 920). For example, scheduling conflict manager 115 may identify features of a program associated with a tuning request (or an ongoing program that is projected to conflict with a DVR recording schedule). Features may include, for example, genre, actors, content ratings, program length, etc.

Process block 840 may further include identifying features of particular recorded content (block 930). For example, scheduling conflict manager 115 may identify features of each recorded content items, such as genre, actors, content ratings, program length, age of the recording, etc.

Process block 840 may additionally include ranking the items of recorded content based on the features of the program intended to be watched, the features of the recorded items, and whether the items have been watched (block 940). For example, scheduling conflict manager 115 may determine a best match of the features from the program the user intended to tune to and the recorded content items (or group of closest matches) to present with conflict notification 120. In one implementation, unwatched content may generally be prioritized over previously watched content.

As described herein, a device may receive a recording schedule for programs to record at a future time and may cause, based on the recording schedule, at least some of the programs to be recorded in the device storage to create recorded content. The device may identify alternate content from the recorded content and may present, to the user, a notification of the conflict. The notification may include a list of at least some of the alternate content from the recorded content such that the user may select recorded content from the notification menu without disrupting the recording schedule.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 8 and 9, the order of the blocks may be modified in other embodiments. Further, non-dependent blocks may be performed in parallel. Additionally, similar blocks may be used to provide transcoder conflict notifications independent from DVR tuner conflicts.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    storing, by a device, a recording schedule for programs to record at a future time;
    causing, by the device and based on the recording schedule, at least some of the programs to be recorded to create recorded content;
    projecting, by the device, use of the device, by a user, to initiate obtaining tuner content that creates a conflict with the recording schedule, wherein the projecting includes one or more of:
        receiving instructions for tuning to a channel, wherein the tuning, in combination with the recording schedule, requires more tuners than are available to the device, or
        projecting a conflict with a currently-viewed channel, wherein continuing to view the currently-viewed channel in combination with the recording schedule, would require more tuners than are available to the device;

selecting, by the device and in response to the detecting, alternate content from the recorded content, wherein the alternate content can be viewed simultaneously with recording the content and without disrupting the recording schedule, and wherein the alternate content has features similar to features of the tuner content that creates the conflict with the recording schedule;

presenting, by the device and to the user, a notification of the conflict, wherein the notification includes a list of at least some of the alternate content that can be presented by the device without using the tuners; and presenting, by the device, recorded content corresponding to a user selection from the list, while maintaining the recording schedule.

2. The method of claim 1, further comprising:
receiving, by the device and from the user, the user selection from the list.

3. The method of claim 1, wherein presenting the notification of the conflict further comprises:
ranking items in the list of at least some of the alternate content.

4. The method of claim 3,
wherein ranking items in the list of at least some of the alternate content further comprises:
identifying features of the tuner content,
identifying features of particular items of the recorded content, and
determining a best match based on the features of the tuner content and the features of the particular items.

5. The method of claim 4, further comprising:
monitoring, by the device, whether the recorded content has been watched, wherein determining a best match is further based on whether the alternate content has been watched.

6. The method of claim 1, wherein the device comprises at least one of a digital video recorder (DVR), a set-top box (STB), or a home media server.

7. The method of claim 1, wherein the use of the device that creates a conflict with the recording schedule further includes:
receiving, from a mobile device, a request for a mobile live stream, wherein servicing, by the device, the request for the mobile live stream would exceed a transcoding capacity of the device.

8. The method of claim 7, wherein the mobile device comprises at least one of a smart phone, a tablet computer, or a laptop computer.

9. The method of claim 1, wherein the recorded content includes one of:
content delivered over-the-top, or
content stored locally on the device.

10. A device, comprising:
a memory configured to store a plurality of instructions; and
a processing unit configured to:
store a recording schedule for programs to record at a future time;
cause, based on the recording schedule, at least some of the programs to be recorded in the memory to create recorded content;
project use of the device, by a user, to initiate obtaining tuner content that creates a conflict with the recording schedule, wherein, when the processor projects, the processor is to one or more of:
receive instructions for tuning to a channel, wherein the tuning, in combination with the recording schedule, requires more tuners than are available to the device, or
project a conflict with a currently-viewed channel, wherein to continue to view the currently-viewed channel in combination with the recording schedule, would require more tuners than are available to the device;
select, in response to the detecting, alternate content from the recorded content, wherein the alternate content can be viewed simultaneously with recording the content and without disrupting the recording schedule, and wherein the alternate content has features similar to features of the tuner content that creates the conflict with the recording schedule;
present, to the user, a notification of the conflict, wherein the notification includes a list of at least some of the alternate content from that can be presented by the device without using the tuners; and
present recorded content corresponding to a user selection from the list, while maintaining the recording schedule.

11. The device of claim 10, wherein the processing unit is further configured to:
receive, from the user, the user selection from the list.

12. The device of claim 10, wherein, when presenting the notification of the conflict, the processing unit is further configured to:
identify features of the tuner content,
identify features of the recorded content, and
rank, based on the features of the tuner content and the features of the recorded content, the items in the list.

13. The device of claim 10, wherein the processing unit is further configured to:
monitor whether the recorded content has been watched, and
rank, based on the monitoring, the alternate content in the list.

14. The device of claim 10, wherein the device comprises at least one of a digital video recorder (DVR), a set-top box (STB), or a home media server.

15. The device of claim 10, wherein the recorded content includes one of:
content delivered over-the-top, or
content stored locally on the memory of the device.

16. A method, comprising:
storing, by a device, multiple requests, up to a limit of a transcoding capacity of the device, to provide transcoded content streams;
transcoding, by the device and based on the multiple requests, content for each of the received multiple requests;
receiving, by the device, another request, from a user, for additional content that requires transcoding and that exceeds the transcoding capacity of the device;
detecting, by the device, a conflict, based on the other request and the transcoding capacity;
selecting, by the device and in response to the detecting, alternate content that can be simultaneously provided, by the device and to the user, during the transcoding of the content for each of the received multiple requests without disrupting the transcoding, wherein the alternate content has features similar to features of the additional content;

presenting, by the device and to the user, a notification of the conflict, wherein the notification includes a list of at least some of the alternate content; and presenting, by the device, particular content corresponding to a user selection from the list, while maintaining the transcoding content for each of the received multiple requests.

17. The method claim 16, further comprising:
receiving, from the user, a selection from the list.

18. The method of claim 16, further comprising:
monitoring whether the alternate content has been previously presented to the user.

19. The method of claim 18, further comprising:
ranking, based on the monitoring, the alternate content in the list.

20. The method of claim 16, wherein the recorded content includes content stored locally on the device.

* * * * *